(12) United States Patent
Hanan et al.

(10) Patent No.: US 12,179,410 B2
(45) Date of Patent: *Dec. 31, 2024

(54) NOZZLE FOR BLOW-MOLDING STEPPED FINISH PREFORM

(71) Applicant: NIAGARA BOTTLING, LLC, Diamond Bar, CA (US)

(72) Inventors: Jay Clarke Hanan, Gelndora, CA (US); Abhishek Shukla, Chino Hills, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,081

(22) Filed: Nov. 6, 2023

(65) Prior Publication Data

US 2024/0075674 A1   Mar. 7, 2024

Related U.S. Application Data

(63) Continuation of application No. 18/047,171, filed on Oct. 17, 2022, now Pat. No. 11,806,917, which is a continuation of application No. 17/240,543, filed on Apr. 26, 2021, now Pat. No. 11,472,093, which is a
(Continued)

(51) Int. Cl.
| | |
|---|---|
| *B29C 49/58* | (2006.01) |
| *B29C 49/12* | (2006.01) |
| *B29C 49/28* | (2006.01) |
| *B29C 49/42* | (2006.01) |

(52) U.S. Cl.
CPC .............. *B29C 49/58* (2013.01); *B29C 49/12* (2013.01); *B29C 49/28* (2013.01); *B29C 2049/4294* (2013.01)

(58) Field of Classification Search
CPC ............ B29C 49/58; B29C 2049/5841; B29C 2049/5803; B29C 2049/4294
See application file for complete search history.

(56) References Cited

U.S. PATENT DOCUMENTS

| | | | |
|---|---|---|---|
| 3,032,809 A | 5/1962 | Willard | |
| 3,303,249 A | 2/1967 | Strauss | |
| 3,769,394 A | 10/1973 | Latrielle | |

(Continued)

FOREIGN PATENT DOCUMENTS

| | | |
|---|---|---|
| CN | 102848559 A | 1/2013 |
| DE | 102012001229 A1 | 7/2013 |

(Continued)

OTHER PUBLICATIONS

European Patent Office Extended Search Report for Related Application No. 20763607.7 dated Oct. 5, 2022 (5 pages).
(Continued)

*Primary Examiner* — Robert B Davis
(74) *Attorney, Agent, or Firm* — Michael Best & Friedrich LLP

(57) ABSTRACT

A nozzle for forming a container preform into a plastic container includes a first cylindrical portion having a first diameter and including a first seal, a second cylindrical portion having a second diameter less than the first diameter and including a second seal, and a transition portion between the first and second cylindrical portions.

19 Claims, 5 Drawing Sheets

Related U.S. Application Data continuation of application No. 16/802,483, filed on Feb. 26, 2020, now Pat. No. 10,987,851.

(60) Provisional application No. 62/810,852, filed on Feb. 26, 2019.

(56) References Cited

U.S. PATENT DOCUMENTS

| | | |
|---|---|---|
| 4,850,850 A | 7/1989 | Takakusaki et al. |
| 5,116,565 A | 5/1992 | Yoshino |
| 5,182,122 A | 1/1993 | Uehara et al. |
| 5,340,302 A | 8/1994 | Ingram |
| 5,498,152 A | 5/1996 | Uterlander et al. |
| 5,756,172 A | 5/1998 | Semersky |
| 5,792,491 A | 8/1998 | Chaure |
| 5,795,598 A | 8/1998 | Wohlgemuth et al. |
| 5,804,016 A | 9/1998 | Schmidt et al. |
| 5,850,681 A | 12/1998 | La Barre |
| 7,824,166 B2 | 11/2010 | Mie et al. |
| 8,663,761 B2 | 3/2014 | Kwirandt et al. |
| 8,827,688 B2 | 9/2014 | Maki et al. |
| 9,033,168 B2 | 5/2015 | Darr et al. |
| 9,994,350 B2 | 6/2018 | Labadie et al. |
| 10,987,851 B2 | 4/2021 | Hanan |
| 11,472,093 B2 * | 10/2022 | Hanan ..................... B29C 49/12 |
| 11,806,917 B2 * | 11/2023 | Hanan ..................... B29C 49/58 |
| 2002/0037338 A1 | 3/2002 | Lisch et al. |
| 2003/0077349 A1 | 4/2003 | Derouault et al. |
| 2004/0121038 A1 | 6/2004 | Seki et al. |
| 2005/0175731 A1 | 8/2005 | Chiang |
| 2008/0050546 A1 | 2/2008 | Kitano et al. |
| 2008/0257855 A1 | 10/2008 | Patel |
| 2010/0151073 A1 | 6/2010 | Daniel |
| 2010/0178148 A1 | 7/2010 | Forsthoevel et al. |
| 2010/0314348 A1 | 12/2010 | Zoppas et al. |
| 2013/0113143 A1 | 5/2013 | Favre et al. |
| 2014/0157726 A1 | 6/2014 | Clusserath et al. |
| 2014/0314984 A1 | 10/2014 | Lehner et al. |
| 2015/0027974 A1 | 1/2015 | Niec |
| 2015/0190975 A1 | 7/2015 | Yokobayashi et al. |
| 2015/0191269 A1 | 7/2015 | Siegl |
| 2016/0193750 A1 | 7/2016 | Gaiotti et al. |
| 2018/0133948 A1 | 5/2018 | Suyama et al. |
| 2020/0031530 A1 | 1/2020 | Hanan |
| 2020/0269484 A1 | 8/2020 | Hanan |
| 2020/0298461 A1 | 9/2020 | Hanan et al. |
| 2023/0069550 A1 | 3/2023 | Hanan |
| 2023/0192344 A1 | 6/2023 | Hanan |
| 2023/0256662 A1 | 8/2023 | Hanan et al. |

FOREIGN PATENT DOCUMENTS

| | | |
|---|---|---|
| JP | S62164504 A | 7/1987 |
| WO | WO2010113079 A2 | 10/2010 |
| WO | WO2016103563 A1 | 6/2016 |

OTHER PUBLICATIONS

European Patent Office Extended Search Report for Related Application No. 20774670.2 dated Oct. 21, 2022 (11 pages).

International Search Report with Written Opinion for related Application No. PCT/US2020/020000 dated Jul. 16, 2020 (9 Pages).

European Patent Office Extended Search Report for Related Application No. 20850662.6 dated Nov. 29, 2023 (16 pages).

European Patent Office Extended Search Report for Related Application No. 24165660.2 dated Aug. 21, 2024 (7 pages).

European Patent Office Extended European Search Report for Related Application No. 24172208.1 dated Oct. 17, 2024 (20 pages).

* cited by examiner

NOZZLE FOR BLOW-MOLDING STEPPED FINISH PREFORM

PRIORITY

This application is a continuation of U.S. patent application Ser. No. 18/047,171, filed Oct. 17, 2022, which is a continuation of U.S. patent application Ser. No. 17/240,543, filed Apr. 26, 2021, now U.S. Pat. No. 11,472,093, which is a continuation of U.S. patent application Ser. No. 16/802,483, filed Feb. 26, 2020, now U.S. Pat. No. 10,987,851, which claims the benefit of and priority to U.S. Provisional Patent Application No. 62/810,852, filed on Feb. 26, 2019, the entirety of each application being incorporated herein by reference.

FIELD

Embodiments of the present disclosure generally relate to the field of plastic bottles and preforms. More specifically, embodiments of the disclosure relate to a nozzle for blow-molding a container preform that includes a stepped interior surface.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic.

A plastic container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish. The finish is adapted to receive a closure, such as a bottle cap, to seal the contents within the interior of the plastic container.

In many instances, the closure includes a tamper evidence band that is disposed around the perimeter of the finish. The tamper evidence band generally remains positioned on the finish when an end-user loosens the closure to access the contents within the container. As such, the tamper evidence band and the finish cooperate to indicate to the end-user whether or not the closure has been previously loosened after being installed by the manufacturer.

Advantages of plastic containers include lighter weight and decreased breakage as compared to glass, and lower costs overall when taking both production and transportation into account. As such, there is a continuous interest in creating the lightest possible plastic container so as to maximize cost savings in both transportation and manufacturing by making and using containers that contain less plastic.

One difficulty that may be encountered when working with relatively light plastic containers is damaging the preforms during the blow-molding process. In some instances, conventional equipment for blow-molding lightweight preforms into containers can crack, scrape, or otherwise damage the preforms, thereby rendering such preforms useless. For example, the relatively thin walls of a lightweight preform are predisposed to cracking when a conventional nozzle for blow-molding the preform is inserted into the finish portion of the preform. As such, there is a need for equipment suitable for forming the lightest possible plastic containers without damaging the thin-walled preforms during the blow-molding process. Embodiments disclosed herein provide nozzles that can be engaged with lightweight preforms for forming the preforms into plastic containers without damaging the finish portion or the thin walls of the preforms.

SUMMARY

An apparatus for a nozzle is provided for engaging with lightweight preforms for blow-molding the preforms into plastic containers without damaging the finish portion of the preforms. The nozzle comprises a first cylindrical portion including a first seal, a second cylindrical portion including a second seal, and a tapered portion between the first and second cylindrical portions. The first and second cylindrical portions include diameters that are less than respective diameters of interior surfaces within the finish portion. The first and second seals are disposed around respective circumferences of the first and second cylindrical portions and configured to tightly engage with the interior surfaces of the preform while maintaining clearance between the nozzle and the interior of the finish portion. In some embodiments, the seals are configured to stabilize an orientation of the preform after being pressed onto the nozzle and facilitate conveying the preform along a manufacturing line. In some embodiments, the nozzle includes a tapered tip comprising a narrowing of the diameter of the first cylindrical portion forward of the first seal so as to provide clearance between the nozzle and the interior surface of the container preform. The tapered tip is configured to prevent damage to interior surfaces of a finish portion comprising the container preform during insertion of the nozzle into the opening. The nozzle includes an opening whereby stretching and/or blow-molding instruments may be inserted into the container preform.

In an exemplary embodiment, a nozzle for forming a container preform into a plastic container comprises: a first cylindrical portion including a first seal; a second cylindrical portion including a second seal; and a tapered portion between the first and second cylindrical portions.

In another exemplary embodiment, the nozzle further includes a tapered tip comprising a narrowing of a diameter of the first cylindrical portion forward of the first seal so as to provide clearance between the nozzle and an interior surface of the container preform. In another exemplary embodiment, the nozzle further comprises an opening whereby stretching and/or blow-molding instruments may be inserted into the container preform. In another exemplary embodiment, the tapered tip is configured to prevent damage to interior surfaces of a finish portion comprising the container preform during insertion of the nozzle into the opening.

In another exemplary embodiment, the first seal is disposed around a circumference of the first cylindrical portion and configured to tightly engage with a first smooth interior surface of a finish portion of the container preform; and wherein the second seal is disposed around the circumference of the second cylindrical portion and configured to tightly engage with a second smooth interior surface of the finish portion. In another exemplary embodiment, the first cylindrical portion includes a diameter that is substantially less than an inner diameter of the first smooth interior surface so as to provide clearance between the first cylindrical portion and the first smooth interior surface. In another exemplary embodiment, the second cylindrical portion includes a diameter that is substantially less than an inner diameter of the second smooth interior surface so as to provide clearance between the second cylindrical portion and the second smooth interior surface. In another exemplary embodiment, the first seal and the second seal are configured to respectively press against the first smooth interior surface and the second smooth interior surface such that clearance is disposed between the first cylindrical portion and the first smooth interior surface and between the second cylindrical portion and the second smooth interior surface. In another exemplary embodiment, the first seal and the second seal comprise O-rings configured to tightly press against mirror-polished interior surfaces within the finish portion.

In another exemplary embodiment, the tapered portion comprises a transition from a diameter of the second cylindrical portion to a diameter of the first cylindrical portion, the diameter of the first cylindrical portion being less than the diameter of the second cylindrical portion. In another exemplary embodiment, the tapered portion is configured to accommodate a decrease in diameter of an interior surface of a finish portion comprising the container preform.

In an exemplary embodiment, a nozzle for forming a container preform into a plastic container comprises: a first cylindrical portion including a first seal and a tapered tip; a second cylindrical portion coupled to the first cylindrical portion by way of a tapered portion; and a second seal mounted onto the tapered portion.

In another exemplary embodiment, the first seal is disposed around a circumference of the first cylindrical portion and configured to tightly engage with a first smooth interior surface of a finish portion of the container preform; and wherein the second seal is disposed around a circumference of the tapered portion and configured to tightly engage with a second smooth interior surface of the finish portion. In another exemplary embodiment, the first seal and the second seal are configured to respectively press against the first smooth interior surface and the second smooth interior surface such that clearance is disposed between the first cylindrical portion and the first smooth interior surface and between the second cylindrical portion and the second smooth interior surface. In another exemplary embodiment, the first seal and the second seal comprise O-rings configured to tightly press against mirror-polished interior surfaces within the finish portion.

In another exemplary embodiment, the first seal is configured to forcibly contact a first transition surface of the finish portion and the second seal is configured to forcibly contact a second transition surface of the finish portion, the first transition surface having a diameter less than a diameter of the second transition surface. In another exemplary embodiment, the first seal and the second seal are configured to respectively contact the first transition surface and the second transition surface so as to stabilize an orientation of the container preform after being pressed onto the nozzle. In another exemplary embodiment, the first seal and the second seal are configured to maintain clearance between an interior of the finish portion and the nozzle. In another exemplary embodiment, the first seal and the second seal are configured to maintain clearance between the container preform and equipment to which the nozzle is coupled.

BRIEF DESCRIPTION OF THE DRAWINGS

The drawings refer to embodiments of the present disclosure in which.

Figure 1:
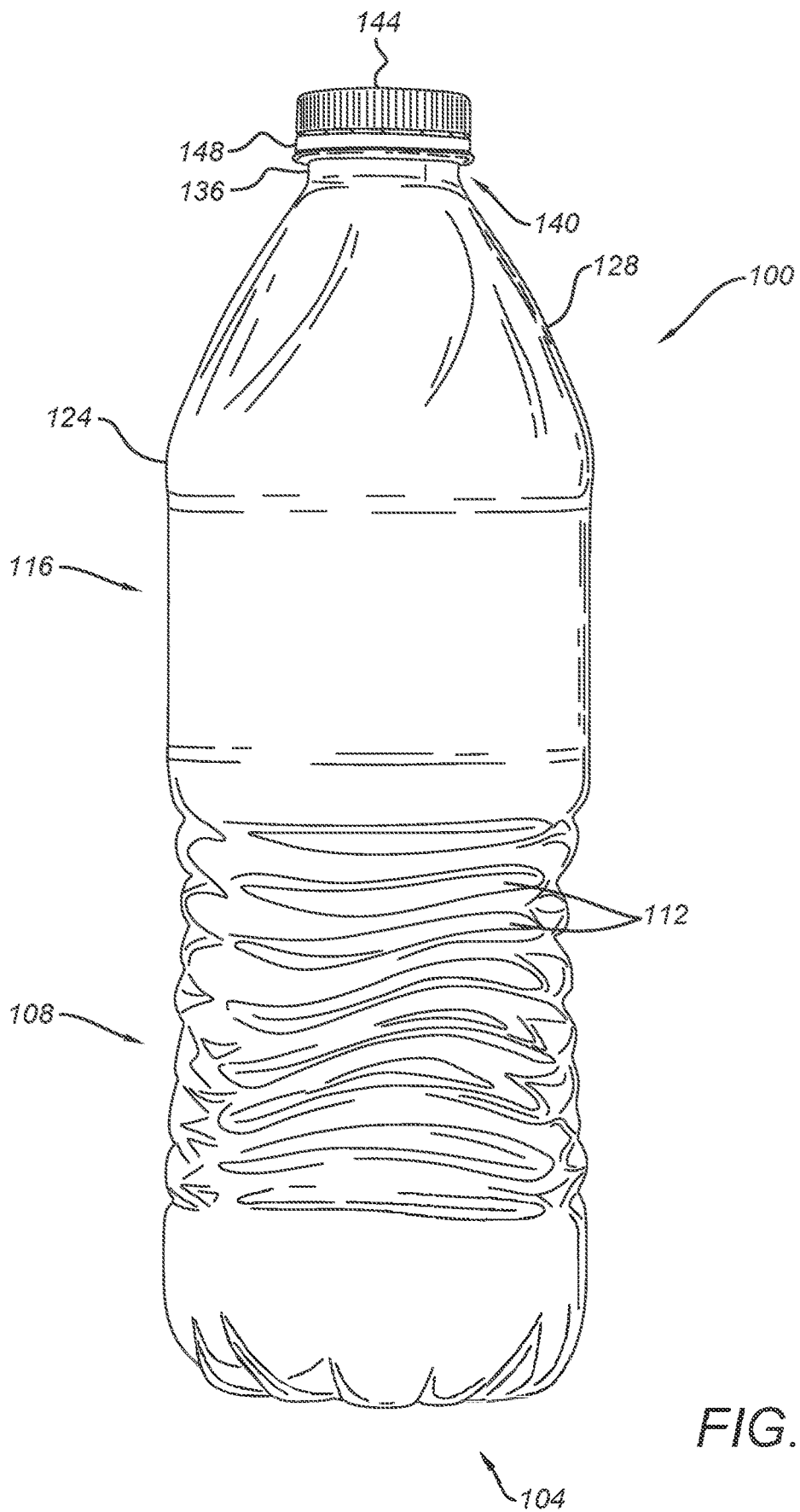
FIG. 1 illustrates a side view of an exemplary container suitable for storing pressurized contents.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first bottle," may be made. However, the specific numeric reference should not be interpreted as a literal sequential order but rather interpreted that the "first bottle" is different than a "second bottle." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, there is a continuous interest in creating the lightest possible plastic container so as to maximize cost savings in both transportation and manufacturing by making and using containers that contain less plastic. One difficulty often encountered when working with lightweight plastic containers is damaging the preforms during the blow-molding process. For example, the relatively thin walls of a lightweight preform frequently are subject to cracking when a conventional nozzle for blow-molding the preform is inserted into the finish portion of the preform. Embodiments disclosed herein provide nozzles that can be engaged with lightweight preforms for blow-molding the preforms into plastic containers without damaging the finish portion of the preforms.

FIG. 1 illustrates a side view of an exemplary container 100 typically used for storing liquid contents, such as water, juice, and particularly carbonated contents. The container 100 comprises a base 104 that extends up to a grip portion 108. In some embodiments, the base 104 may be of the petaloid variety, although other configurations of the base may be incorporated into the container 100, without limitation. The grip portion 108 comprises a plurality of grip portion ribs 112 (i.e., sidewall ribs). As illustrated in FIG. 1, the plurality of grip portion ribs 112 generally vary in depth, and swirl or angulate around the grip portion 108. A label portion 116 is connected to the grip portion 108 and comprises one or more label panel ribs (not shown). The label panel portion 116 transitions into a shoulder 124, which connects to a bell 128.

In the embodiment illustrated in FIG. 1, the bell 128 comprises a plurality of design features 132. In other embodiments, however, the bell 128 may include various other design features, or may be smooth and generally unornamented. The bell 128 connects to a neck 136, which connects to a finish 140. As shown in FIG. 1, the bell 128 comprises a diameter that generally decreases as the bell 128 extends upward from the shoulder 124 to the neck 136 and the finish 140. The finish 140 is adapted to receive a closure, such as by way of non-limiting example, a container cap or closure 144, so as to seal contents within the container 100. The finish 140 generally defines an opening that leads to an interior of the container 100 for containing a beverage, or other contents, such as any of a variety of carbonated soft drinks. The finish 140 may be of the Carbonated Soft Drink (CSD) variety or may be configured to receive closures suitable for sealing noncarbonated contents within the interior of the container 100.

Figure 3:
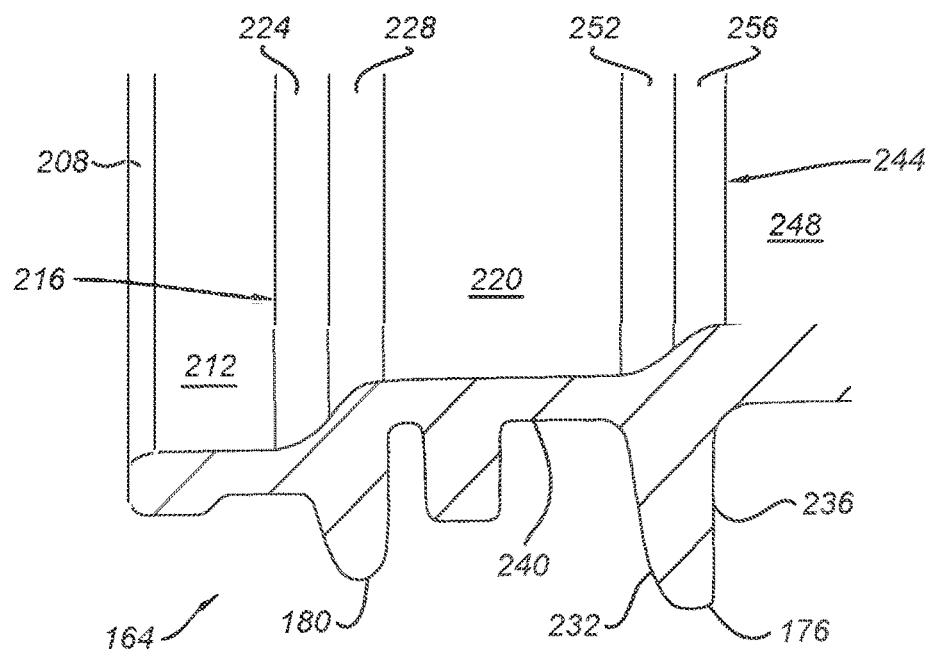
FIG. 3 illustrates a close-up cross-sectional view of a sidewall portion of a finish comprising the preform illustrated in FIG. 2, according to the present disclosure.

As shown in FIG. 1, a tamper evidence closure 144 may be threadably engaged with the finish 140 of FIG. 3. The closure 144 generally includes interior threads that are configured to engage with threads disposed on the finish 140, as described herein. During tightening of the closure 144 onto the finish 140, a plug seal of the closure 144 extends into the opening of the container 100 and enters into a pressed relationship with the finish 140 whereby contents may be sealed in the interior of the container 100.

As further shown in FIG. 1, the closure 144 includes a tamper evidence band 148 to provide an indication of whether or not the closure 144 has been loosened after being installed by a manufacturer. In some embodiments, the tamper evidence band 148 may be attached to the closure 144 by a multiplicity of thin connections. The tamper evidence band 148 may include a cam that is configured to fixedly engage with a tamper evidence ledge disposed on the finished 140 during loosening of the closure 144. Once the closure 144 is installed onto the finish 140 by a manufacturer and later an end-user loosens the closure 144, the cam engages the tamper evidence ledge, breaking the thin connections between tamper evidence band 148 and the closure 144. The tamper evidence band 148 remains positioned on the tamper evidence ledge after the closure 144 is removed from the container 100. As such, the tamper evidence band 148 cooperates with the tamper evidence ledge to indicate to the end-user whether or not the closure 144 has been previously loosened after being installed by the manufacturer.

Figure 2:
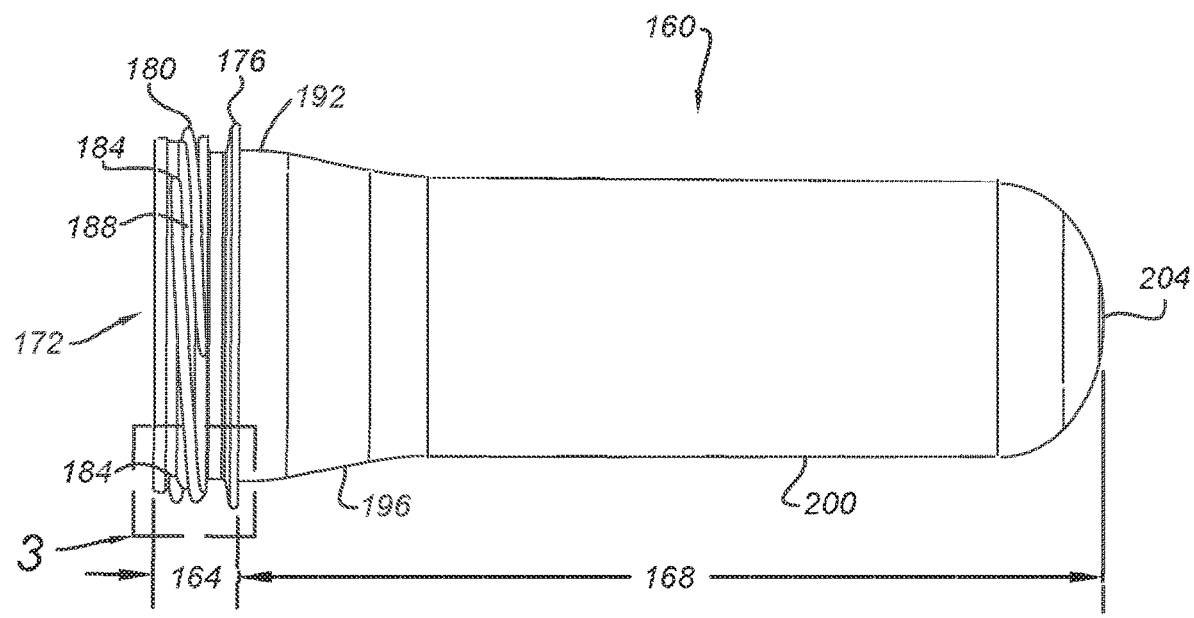
FIG. 2 a side plan view of an exemplary embodiment of a preform suitable for being blow-molded to form a container in accordance with the present disclosure.

FIG. 2 illustrates an exemplary embodiment of a preform 160 suitable for being blow-molded to form a plastic bottle, such as the container 100, according to the present disclosure. The preform 160 preferably is made of material approved for contact with food and beverages such as virgin PET or recycled PET and can be of any of a wide variety of shapes and sizes. The preform 160 shown in FIG. 2 is of the type which will form a 12-16 oz. beverage bottle, but as will be understood by those skilled in the art, other preform configurations may be used depending upon the desired configuration, characteristics and use of the final article. The preform 160 may be made by injection molding methods, without limitation.

The preform 160 includes a finish portion 164 and a body portion 168, formed monolithically (i.e., as a single, or unitary, structure). Advantageously, the monolithic arrangement of the preform 160, when blow-molded into a bottle, provides greater dimensional stability and improved physical properties in comparison to a preform constructed of separate neck and body portions that are bonded together.

The finish portion 164 begins at an opening 172 to an interior of the preform 160 and extends to and includes a tamper evidence ledge 176. The finish portion 164 is further characterized by the presence of one or more threads 180 configured to provide a means to fasten a closure, such as a cap, to the bottle produced from the preform 160. As such, the threads 180 are configured to rotatably engage with similar threads disposed within the cap to provide a way to seal contents within the bottle. In the embodiment illustrated in FIG. 2, each of the threads 180 generally extends along a section of the circumference of the finish portion 164 and approaches the tamper evidence ledge 176. Thus, when the threads of a cap are engaged with the threads 180, and the cap is rotated in a clockwise direction, the cap advances toward the tamper evidence ledge 176.

With continuing reference to FIG. 2, each of the one or more threads 180 begins at a thread start 184 and extends along an angular section of the finish portion 164. The thread start 184 is configured to guide the thread 180 into a space, or valley, between adjacent threads of the cap so as to threadably engage the cap with the finish portion 164. Further, the threads 180 generally are disposed adjacently to one another, separated by a valley 188, and are spaced uniformly around the circumference of the finish portion 164. In some embodiments, wherein three threads 180 are disposed around the finish portion 164, the thread starts 184 of adjacent threads 180 are spaced at substantially 120-degree intervals around the perimeter of the finish portion 164. As will be appreciated, however, more or less than three threads 180 may be incorporated into the finish portion 164 without deviating beyond the scope of the present disclosure.

In some embodiments, a plurality of gaps may be disposed in the threads 180 and positioned uniformly around the perimeter of the finish portion 164. Preferably, the gaps of adjacent threads 180 are vertically aligned so as to form channels extending longitudinally along the finish portion 164. The channels advantageously operate to relieve pressure within the container 100 when the container 144 is loosened. As will be appreciated, the channels may provide a direct route for gases escaping the interior of the container 100, rather than the gases being forced to travel around the finish portion 164 between adjacent threads 180.

The body portion 168 includes a neck portion 192 that extends to a tapered portion 196 of the body portion 168. The tapered portion 196 comprises a smooth transition from a diameter of the neck portion 192 to a relatively smaller diameter of a cylindrical portion 200 of the preform 160. The cylindrical portion 200 is a generally elongate member that culminates in an end cap 204. In some embodiments the body portion 168 may be generally cylindrical, and the end cap 204 may be conical or frustoconical and may also be hemispherical, and the very terminus of the end cap 204 may be flattened or rounded.

In some embodiments, a wall thickness of the cylindrical portion 200 may be substantially uniform throughout the cylindrical portion 200 and the end cap 204. A wall thickness of the tapered portion 196, however, generally decreases from the wall thickness of the cylindrical portion 200 to a relatively thinner wall thickness of the neck portion 192. As will be appreciated, the wall thickness of the cylindrical portion 200 is relatively greater than the wall thickness of the neck portion 192 so as to provide a wall thickness at the desired dimensions of a finished product after the preform 160 is blow-molded into the shape and size of a bottle. As such, the wall thickness throughout most of the body portion 168 will depend upon the overall size of the preform 160 and the wall thickness and overall size of the resulting container.

FIG. 3 illustrates a close-up cross-sectional view of a sidewall of the finish portion 164 illustrated in FIG. 2. As will be appreciated, the finish 164 comprises a cylindrical body that begins at the opening 172 to the interior of the container 100 and extends to and includes the tamper evidence ledge 176. The finish portion 164 includes a bevel 208 disposed at the beginning of the opening 172. The bevel 208 is configured to enter into sliding contact with a plug seal of the closure 144 so as to prevent contents from leaking out of the container 100 formed from the preform 160. In some embodiments, the bevel 208 operates to guide the plug seal onto a sealing surface 212 disposed on an interior of the finish portion 164. In general, the bevel 208 and the sealing surface 212 comprise portions of the interior of the finish portion 164 that extend circumferentially around the opening 172.

As will be appreciated, the sealing surface 212 must comprise a sufficiently smooth surface capable of cooperating with the plug seal to retain contents under pressure, such as carbonated contents, within the container 100. To this end, it is contemplated that the sealing surface 212 may be highly polished so as to be substantially free of surface defects and thus conditioned to form a tight seal with the plug seal of the closure 144. Preferably, the sealing surface 212 is to be polished to a degree of smoothness that is commonly associated with a mirror finish. As such, it is contemplated that the sealing surface 212 comprises a mirror polished region along the interior of the finish portion 164. Further, in some embodiments, the bevel 208 may also be conditioned to comprise a mirror polished region at the beginning of the opening 172. Any of various techniques may be used to mirror polish either or both of the sealing surface 212 and the bevel 208, without limitation.

As shown in FIG. 3, the sealing surface 212 extends away from the bevel 208, deeper into the opening 172 to a transition surface 216. The transition surface 216 comprises a region within the interior of the finish portion 164 wherein the interior diameter of the opening 172 generally narrows from the diameter of the sealing surface 212 to a smaller diameter of a handing surface 220. In the embodiment illustrated in FIG. 3, the transition surface 216 comprises a reverse curve surface that includes a concave portion 224 that extends from the sealing surface 212 and joins with a convex portion 228 that extends to the handing surface 220. As will be recognized, the handling surface 220 includes a diameter of the opening 172 that is configured to receive various forms of equipment used to configure the preform 160 into the container 100.

It is contemplated that the transition surface 216 is to be capable of cooperating with the plug seal of the closure 144 to form a tight seal between the closure 144 and the container 100. In some embodiments, the concave portion 224 may be configured to forcibly receive an end of the plug seal so as to form a tight seal therebetween. Further, in some embodiments, the convex portion 228 may be configured to forcibly receive the end of the plug seal. As such, the transition surface 216 may include a smooth surface that is polished similarly to the sealing surface 212. It is envisioned that the transition surface 216 may be mirror polished, as described hereinabove with respect to the sealing surface 212.

Moreover, in some embodiments, the plug seal of the closure 144 may be configured to extend into the opening such that the plug seal cooperates with the handling surface 220 to seal the container 100. In such embodiments, the plug seal may include a sidewall shape that mates with the concave and convex portions 224, 228. As will be appreciated, therefore, the handling surface 220 may be mirror polished similarly to the sealing surface 212 and the transition surface 216. It is contemplated that mirror polished surface may be achieved by way of any of various suitable polishing techniques, such as mechanical machining and buffing, chemical treatments, plasma treatments, and the like, without limitation.

In some embodiments, such as the illustrated embodiment of FIG. 3, a secondary transition surface 244 may be disposed between the handling surface 220 and an interior surface 248 of the body portion 168. In general, the secondary transition surface 244 comprises a region within the interior of the finish portion 164 wherein the interior diameter of the opening 172 narrows from the diameter of the handling surface 220 to a smaller diameter of the interior surface 248. In the embodiment illustrated in FIG. 3, the secondary transition surface 244 comprises a reverse curve surface that includes a concave portion 252 that extends from the handling surface 220 to a convex portion 256 that extends to the interior surface 248.

In some embodiments, the secondary transition surface 244 may be configured to cooperate with the plug seal of the closure 144 to form a tight seal between the closure 144 and the container 100 suitable for storing pressurized contents, such as carbonated beverages, within the container 100. As such, the concave portion 252 may be configured to tightly receive an end of the plug seal to form a tight seal therebetween. In some embodiments, the convex portion 256 may be configured to forcibly receive and compress the end of the plug seal. To this end, the secondary transition surface 244 preferably includes a smooth surface that is polished similarly to the sealing surface 212. It is envisioned that the secondary transition surface 244 may be mirror polished, as described hereinabove with respect to the sealing surface 212.

In some embodiments, the plug seal of the closure 144 may be configured to extend into the opening 172 such that the plug seal extends beyond the secondary transition surface 244 and thus cooperates with the portion of the interior surface 248 near the convex portion 256. In some embodiments, the interior surface 248 may have a diameter that tightly compresses the end of the plug seal to seal the pressurized contents within the container 100. It is contemplated that, in some embodiments, the plug seal may include a sidewall profile that mates with the concave and convex portions 252, 256. As such, the interior surface 248 preferably is mirror polished similarly to the mirror polish of the sealing surface 212. As disclosed hereinabove, the mirror polished surface may be achieved by way of any of various suitable polishing techniques, such as mechanical machining and buffing, chemical treatments, plasma treatments, and the like, without limitation.

In the embodiment illustrated in FIG. 3, the surfaces 212, 220, 248 generally comprise a stepped interior of the finish portion 164. As such, the stepped interior comprises a graduated narrowing of the opening 172 that extends from the bevel 208, through the finish portion 164, to the tamper evidence ledge 176. It is contemplated that the stepped interior comprises multiple sidewall portions of the finish 164 that may be configured to advantageously minimize the quantity of resin comprising the finish portion 164, as compared to finish portions comprising a substantially uniform diameter.

In some embodiments, the stepped interior may be configured to compressibly receive a plug seal of the closure 144 that comprises graduated seals configured to tightly engage with the graduated narrowing of the opening 172. For example, the stepped interior can include one or more sealing surfaces that are each configured to tightly engage with one of the graduated seals of the plug seal to contribute to forming a tight seal between the closure 144 and the container 100. As will be appreciated, therefore, the graduated seals of the plug seal generally include diameters that are suitable for engaging with the graduated narrowing of the opening 172 so as to seal pressurized contents, such as carbonated beverages, within the container 100. It is contemplated that the one or more sealing surfaces comprise mirror-polished surfaces that are joined together by transition surfaces. Further, the transition surfaces are contemplated to comprise mirror-polished surfaces that cooperate with the one or more seals of the plug seal so as to contribute to forming the tight seal between the closure 144 and the container 100.

In the exemplary embodiment shown in FIG. 3, the sealing surface 212 is configured to compressibly receive a first seal comprising the plug seal, and the handing surface 220 is configured to compressibly receive a second seal of the plug seal. Further, the interior surface 248 may be configured to compressibly receive a third seal comprising the plug seal. Accordingly, the sealing surface 212 includes a first diameter configured to tightly compress the first seal of the plug seal, and the handling surface 220 includes a second diameter configured to tightly compress the second seal. The interior surface 248 includes a third diameter configured to tightly compress the third seal of the plug seal. As will be appreciated, the third diameter is equal to or less than the second diameter, and the second diameter is equal to or less than the first diameter. Further, the transition surface 216 comprises a change in diameter of the opening 172 that transitions from the first diameter of the sealing surface 212 to the second diameter of the handling surface 220. The secondary transition surface 244 comprises a change in diameter of the opening 172 that transitions from second diameter of the handling surface 220 to the third diameter of the interior surface 248. As disclosed hereinabove, the transition surfaces 216, 244 comprise mirror-polished surfaces that may be formed by way of any of various suitable polishing techniques.

Figure 4:
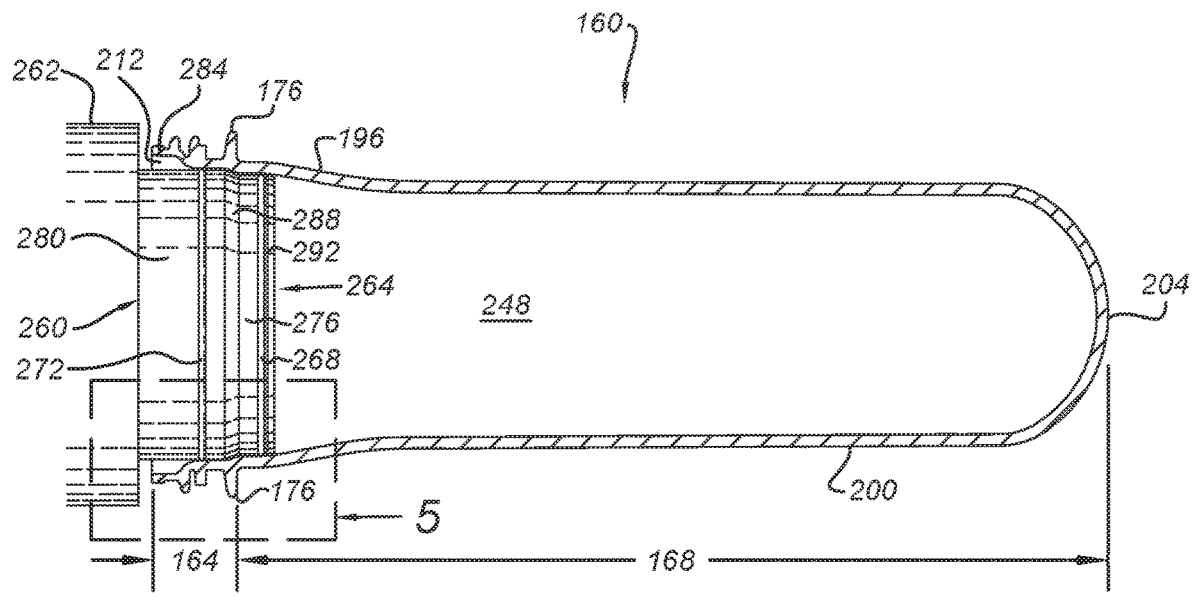
FIG. 4 illustrates a cross-sectional view of a container preform including a stepped interior surface that is engaged with an exemplary embodiment of a nozzle for forming lightweight containers according to the present disclosure.

Turning now to FIG. 4, a nozzle 260 for blow-molding the preform 160 into a container is shown inserted into the finish portion 164 and engaged with the stepped interior. The nozzle 260 generally is a cylindrical member coupled with other blow-molding equipment 262 and configured to tightly engage with the graduated narrowing of the opening 172. The nozzle 260 includes an opening 264 whereby instruments may be inserted into the preform 160 for stretching and/or blow-molding the preform 160 into the container 100. A first seal 268 and a second seal 272 are disposed around the circumference of the nozzle 260 and configured to tightly engage with the smooth surfaces inside the finish portion 164. In some embodiments, the first and second seals 268, 272 comprise O-rings that are configured to tightly press against the mirror-polished surfaces of the finish portion 164 without damaging the surfaces or the walls of the finish portion 164. As such, it is contemplated that the preform 160 may be pressed onto the nozzle 260 and retained thereon during being conveyed along a manufacturing line.

Figure 5:
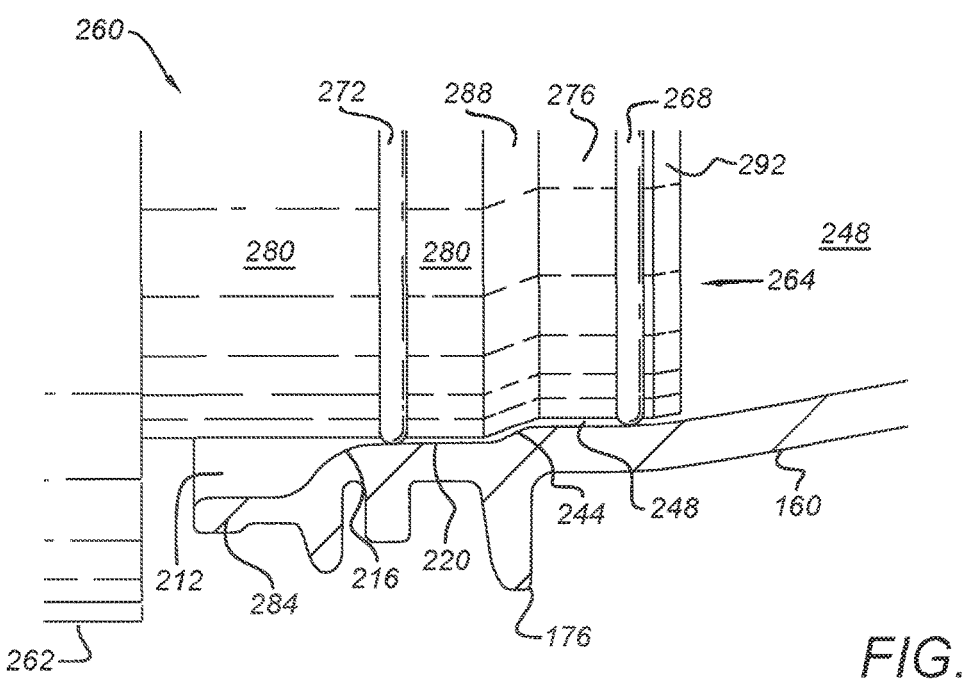
FIG. 5 illustrates a close-up cross-sectional view of a sidewall portion of the preform of FIG. 4 that is engaged with an exemplary embodiment of a nozzle for forming lightweight containers, in accordance with the present disclosure.

In the illustrated embodiment of FIGS. 4-5, the nozzle 260 includes a first cylindrical portion 276 and a second cylindrical portion 280. The first cylindrical portion 276 comprises a diameter suitable for pressing the first seal 268 against the interior surface 248, and the second cylindrical portion 280 has a diameter suitable for pressing the second seal 272 against the handling surface 220. As best shown in FIG. 5, the seals 268, 272 preferably contact the surfaces 248, 220 while maintaining an advantageously degree of clearance between the surfaces 248, 220 and the first and second cylindrical portions 276, 280. As will be appreciated, preventing contact between the cylindrical portions 276, 280 of the nozzle 260 and the surfaces 248, 220 obviates any damage occurring to the mirror-polished surfaces of the finish portion 164.

With reference to FIG. 5, the sealing surface 212 is surrounded by a thin-walled region 284 of the finish portion 164. In the case of lightweight preforms, such as the preform 160, the thin-walled region 284 is susceptible to being damaged by contact with conventional blow-molding nozzles. As such, the diameter of the second cylindrical portion 280 is configured to be substantially less than the inner diameter of the sealing surface 212, thereby providing clearance between the second cylindrical portion 280 and the sealing surface 212. Further, engaging the first and second seals 268, 272 with the surfaces 248, 220, as described herein, provides clearance between the finish portion 164 and the blow-molding equipment 262. It is contemplated that preventing contact between the sealing surface 212 and the cylindrical portion 280, as well as preventing contact between the finish portion 164 and the blow-molding equipment 262 prevents any stress being applied to the thin-walled regions 284 of the finish portion 164. As will be appreciated, therefore, in the embodiment of FIGS. 4-5, damage to the thin-walled region 284 of the finish portion 164 is substantially eliminated.

In the embodiment of the nozzle 160 illustrated in FIGS. 4-5, a tapered portion 288 is disposed between the first and second cylindrical portions 276, 280, and a tapered tip 292 is disposed forward of the first seal 268. As will be appreciated, the tapered portion 288 and the tapered tip 292 comprise decreases in the diameter of the nozzle 160 that are configured to accommodate the stepped interior of the preform 160. As shown in FIG. 5, the tapered portion 288 comprises a transition from the diameter of the second cylindrical portion 280 to the smaller diameter of the first cylindrical portion 276. Thus, the tapered portion 288 accommodates the change in diameter of the interior of the finish portion 164 occurring across the transition surface 244 between the handling surface 220 and the interior surface 248. The tapered tip 292 generally comprises a narrowing of the diameter of the first cylindrical portion 276 forward of the first seal 268 so as to provide clearance between the nozzle 260 and the interior surface 248 of the preform 160. The tapered tip 292 is not limited to comprising a linearly tapering diameter of the nozzle 260, as shown in FIG. 5, but rather other shapes are contemplated. For example, in some embodiments, the tapered tip 292 may comprise an inwardly rounded portion of the cylindrical portion 276. It is contemplated that the tapered tip 292 preferably is configured to prevent damage to the mirror-polished surfaces inside the finish portion 164 during insertion of the nozzle 260 into the opening 172.

As will be appreciated, forcibly pushing the preform 160 onto the nozzle 260, as shown in FIG. 4, may cause the tapered portion 288 to contact the transition surface 244 inside the finished portion 164. It is contemplated that while the first and second seals 268, 272 tightly engage with the mirror-polished surfaces 248, 220, contact between the tapered portion 288 and the transition surface 244 may operate to stabilize the orientation of the preform 160 on the nozzle 260. In some embodiments, such contact between the tapered portion 288 and the transition surface 244 may be deemed acceptable due to the relatively thick sidewall of the preform 160 surrounding the transition surface 244. It should be noted, however, that any contact between the nozzle 260 and the preform 160, other than by way of the seals 268, 272, stands a likelihood of blemishing the transition surface 244.

Figure 6:
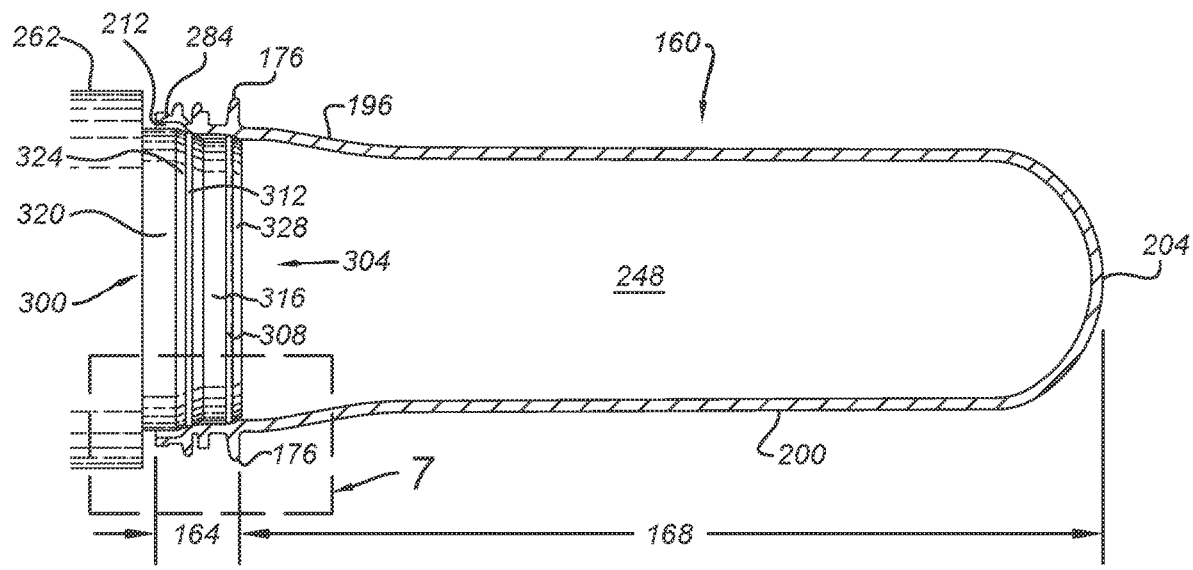
FIG. 6 illustrates a cross-sectional view of a container preform including a stepped interior surface that is engaged with an exemplary embodiment of a nozzle for forming lightweight containers according to the present disclosure.

It is contemplated that, in some embodiments, blemishing of the transition surface 244, even if minor, may be undesirable. FIG. 6 illustrates a cross-sectional view of the preform 160 engaged with an exemplary embodiment of a nozzle 300 that is configured to avoid blemishing any of the mirror-polished surfaces inside the finish portion 164 of the preform 160. The nozzle 300 is similar to the nozzle 260 of FIG. 4, with the exception that the nozzle 300 includes seals that are configured to stabilize the orientation of preform 160 on the nozzle 300 without blemishing the finish portion 164. As such, the nozzle 300 generally is a cylindrical member coupled with other blow-molding equipment 262 and configured to tightly engage with the interior of the finish portion 164. The nozzle includes an opening 304 through which instruments may be extended into the interior of the preform 160 for stretching and/or blow-molding the preform 160 into the container 100. The nozzle 300 includes a first seal 308 and a second seal 312 that are disposed around the circumference of the nozzle 300. It is contemplated that the first and second seals 308, 312 comprise O-rings, or other similar devices, configured to tightly press against the mirror-polished surfaces within the finish portion 164 without damaging the surfaces or the weakening the walls of the finish portion 164. As will be appreciated, therefore, the preform 160 may be pressed onto the nozzle 300 and retained thereon during being conveyed along a manufacturing line.

As shown in FIG. 6, the nozzle 300 includes a first cylindrical portion 316 and a second cylindrical portion 320 that share an intervening tapered portion 324. A tapered tip 328 extends forward of the first cylindrical portion 316. The second cylindrical portion 320 comprises a diameter of the nozzle 300 that is less than the diameter of the sealing surface 212. The diameter of the second cylindrical portion 320 is sized to allow the nozzle 300 to be extended into the opening 172 of the finish portion 164 without the nozzle 300 contacting the sealing surface 212. Similarly, the first cylindrical portion 316 comprises a diameter of the nozzle 300 that is less than the diameter of the handing surface 220 so as to prevent contact between the nozzle 300 and the handling surface 220.

With continuing reference to FIG. 6, the tapered portion 324 and the tapered tip 328 comprise decreases in the diameter of the nozzle 300 that are configured to prevent contact between the nozzle 300 and the stepped interior of the preform 160. The tapered portion 324 generally comprises a transition from the diameter of the second cylindrical portion 320 to the smaller diameter of the first cylindrical portion 316. As such, the tapered portion 324 accommodates the change in diameter of the interior of the finish portion 164 occurring across the transition surface 216 between the sealing surface 212 and the handling surface 220. The tapered tip 328 comprises a narrowing of the diameter of the first cylindrical portion 304 forward of the first seal 308 so as to prevent the nozzle 300 from contacting the transition surface 244 and the interior surface 248 of the preform 160. As discussed in connection with the tapered tip 292, the tapered tip 328 is not limited to the specific shape illustrated in FIG. 6, but rather other shapes are contemplated. It is envisioned that the tapered tip 328 may be implemented with any shape that is found to prevent damage to the mirror-polished surfaces inside the finish portion 164 during insertion of the nozzle 300 into the opening 172.

Figure 7:
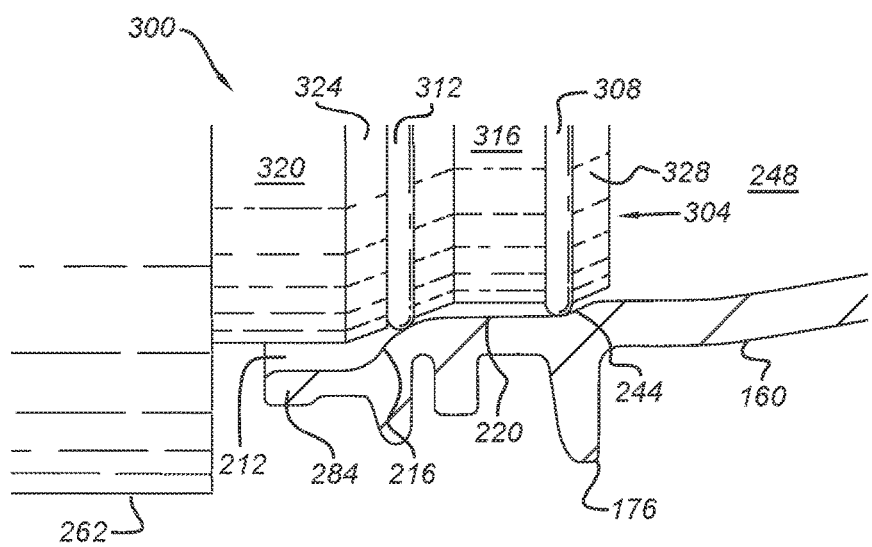
FIG. 7 illustrates a close-up cross-sectional view of a sidewall portion of the preform of FIG. 6 that is engaged with an exemplary embodiment of a nozzle for forming lightweight containers, in accordance with the present disclosure.

As best shown in FIG. 7, the first seal 308 is coupled with the nozzle 300 between the first cylindrical portion 316 and the tapered tip 328, such that the first seal 308 forcibly contacts the transition surface 244 when the preform 160 is pressed onto the nozzle 304. Similarly, the second seal 312 is coupled with the tapered portion 324, such that the second seal 312 forcibly contacts the transition surface 216 when the preform 160 is pressed onto the nozzle 304. It should be recognized, therefore, that while the first seal 308 tightly engages with the mirror-polished surface 220, forcible contact of the seals 308, 312 with the transition surfaces 244, 216 stabilize the orientation of the preform 160 on the nozzle 300, as well as ensuring that clearance remains between the preform 160 and the equipment 262. It is contemplated, therefore, that the nozzle 300 advantageously facilitates pressing the preform 160 onto the nozzle 300 for being conveyed along a manufacturing line, as well as stretching and/or blow-molding the preform 160 into the container 100, without any damage or blemishes being imparted to the sidewalls and mirror-polished surfaces of the finish portion 164.

Figure 8:
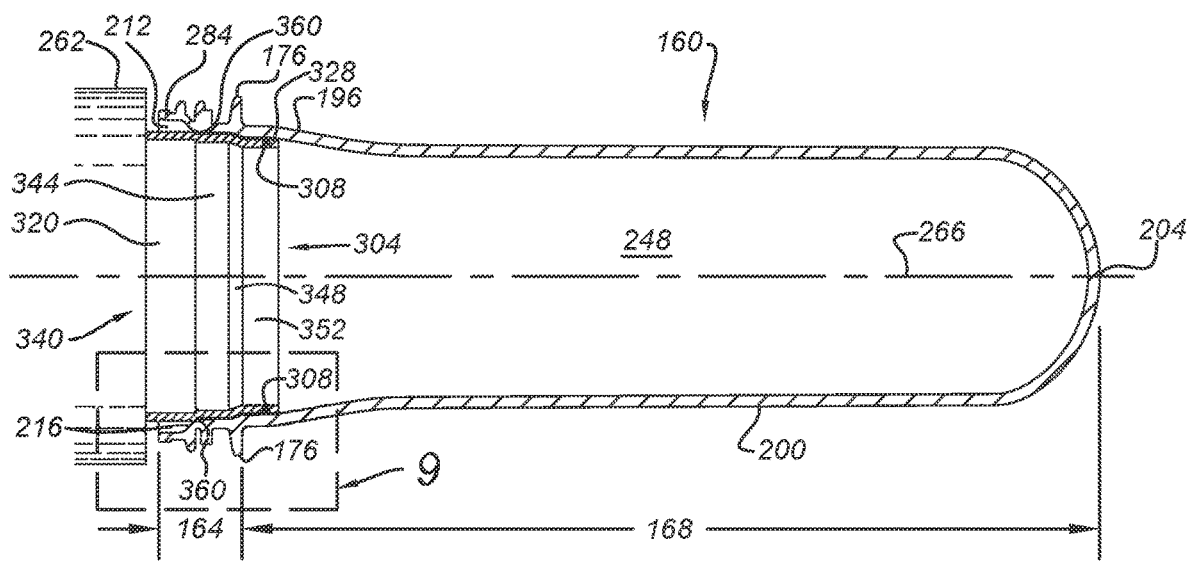
FIG. 8 illustrates a cross-sectional view of a container preform including a stepped interior surface that is engaged with an exemplary embodiment of a nozzle for forming lightweight containers according to the present disclosure.
Figure 9:
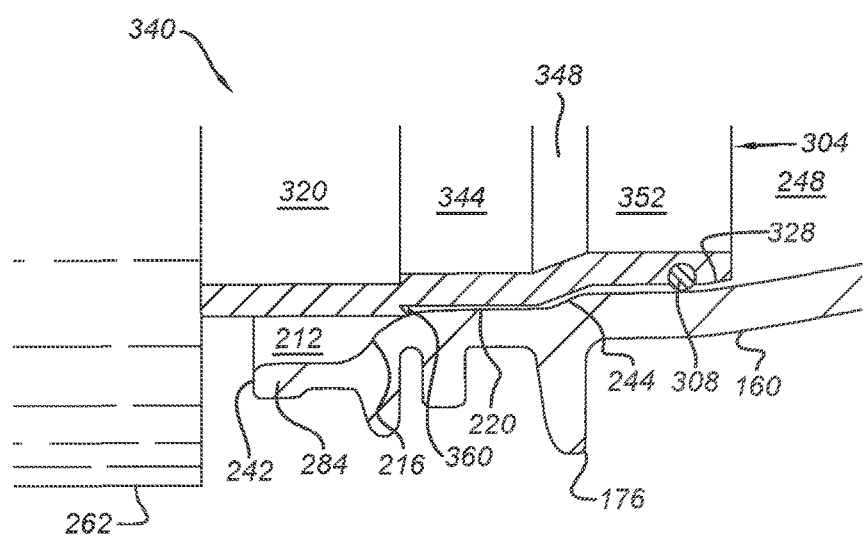
FIG. 9 illustrates a close-up cross-sectional view of a sidewall portion of the preform of FIG. 8 that is engaged with an exemplary embodiment of a nozzle for forming lightweight containers, in accordance with the present disclosure.

FIGS. 8-9 illustrate an exemplary embodiment of a nozzle 340 for blow-molding the preform 160 of FIG. 3 into a container, such as the container 100. Similar to the nozzles described hereinabove, the nozzle 340 is configured to be inserted into the finish portion 164, parallel to the longitudinal axis 266 of the preform 160 and engaged with the stepped interior of the preform 160. The nozzle 340 comprises a first cylindrical portion 320 that may be coupled with other blow-molding equipment 262. The cylindrical portion 320 transitions to a second cylindrical portion 344 configured to accommodate the diameter of the handling surface 220. The nozzle 340 includes a tapered portion 348 that joins the second cylindrical portion with a third cylindrical portion 352. The third cylindrical portion 352 includes a diameter configured to accommodate the inner diameter of the interior surface 248 of the preform 160. The third cylindrical portion 352 extends to tapered tip 328 that includes an opening 304 whereby instruments may be inserted into the preform 160 for stretching and/or blow-molding the preform 160 into the container 100. The tapered tip 328 is configured to extends into the interior of the preform 160 without damaging the surfaces 212, 220, 248 or the sidewall of the finish portion 164.

As best shown in FIG. 9, a circular edge 360 is disposed between the first and second cylindrical portions 320, 344. The circular edge 360 is configured to forcibly contact the transition surface 216 of the finish portion 164. Preferably, the circular edge 360 has a diameter suitable to contact the transition surface 216 while providing clearance between the first cylindrical portion 320 and the sealing surface 212. Upon the nozzle 340 being inserted into the finish portion 164, the circular edge 360 digs into the material comprising the transition surface 216, thereby establishing a tight seal between the nozzle 340 and the interior of the preform 160. As such, it is contemplated that the circular edge 360 may be sharpened or remain blunt, as desired. Further, the first cylindrical portion 320 generally, and the circular edge 360 in particular, may comprise any rigid material suitable for digging into the material comprising the transition surface 216.

In general, the circular edge 360 is configured to be pressed against the transition surface 216 such that the force of contact is directed parallel to the longitudinal axis 266, along the sidewall of the finish portion 164. As will be appreciated, directing the contact force parallel to the sidewall of the finish portion 164 allows for tighter sealing between the nozzle 340 and the preform 160, thereby facilitating greater internal pressures within the preform 160 without cracking the thin-walled region 284 of the finish portion 164 during stretching and/or blow-molding the preform 160 to form the container 100. Further, the nozzle 340 may include a seal 308 that is disposed around the circumference of the third cylindrical portion 352 and configured to guide the nozzle 340 during entering the interior of the preform 160. It is contemplated that the seal 308 may comprise an O-ring, or other similar device, configured to tightly press against the mirror-polished interior surface 348 within the finish portion 164 without damaging the surfaces or the weakening the walls of the finish portion 164. As will be appreciated, therefore, the preform 160 may be pressed onto the nozzle 340 and retained thereon during being conveyed along a manufacturing line.

As described hereinabove, the thin-walled region 284 surrounding the sealing surface 212 of lightweight preforms, such as the preform 160, is susceptible to being damaged by contact with conventional blow-molding nozzles. Outward forces on the thin-walled region 284, due to forcible contact between the surface 212 and a conventional nozzle or internal pressure during blow-molding the preform 160, tends to damage the sealing surface 212 and/or cause stress-failures within the thin-walled region 284. The nozzle 340 eliminates such outwardly directed forces by engaging circular edge 360 with the transition surface 216 inside the finish portion 164. As will be appreciated, sealing the circular edge 360 against the transition surface 216 counteracts any outwardly directed force components that may arise during stretching and/or blow-molding the preform 160 to form the container 100. As such, a greater internal pressure within the preform 160 may be used to form the container 100 without harming the thin-walled region 284 of the finish portion 164. Further, it is contemplated that engaging the circular edge 360 with the transition surface 216 obviates any need for sealing the nozzle 340 or other blow-molding equipment 262 against a top-most surface 242 of the preform 160, which eliminates exerting damaging forces on the thin-walled region 284 of the finish portion 164 during stretching and/or blow-molding the preform 160 to form the container 100.

Turning again to FIG. 3, the tamper evidence ledge 176 comprises a rounded upper portion 232 and a substantially flat lower portion 236. As will be appreciated, the rounded upper portion 232 facilitates passing the tamper evidence band 148 of the closure 144 over the tamper evidence ledge 176 during assembly of the closure 144 onto the container 100. The flat lower portion 236 is configured to retain the tamper evidence band 148 positioned below the tamper evidence ledge 176 during loosening of the closure 144. For example, when the closure 144 is initially installed onto the container 100 by a manufacturer, the tamper evidence band 148 easily passes over the tamper evidence ledge 176 due to the rounded upper portion 232. When an end-user later loosens the closure 144, the flat lower portion 236 retains the tamper evidence band 148 below the tamper evidence ledge 176, causing the tamper evidence band 148 to break loose from the closure 144. Thus, the flat lower portion 236 of the tamper evidence ledge 176 and the tamper evidence band 148 of the closure 144 cooperate to indicate to the end-user that the closure 144 has not been previously loosened after being installed by the manufacturer. It should be understood, however, that the tamper evidence ledge 176 is not limited to being coupled with tamper evidence bands, as described above, but rather the tamper evidence ledge 176 may be configured to operate with any of various devices for indicating whether or not the container has been previously opened.

Disposed between the tamper evidence ledge 176 and the threads 180 is a handling valley 240 that extends circumferentially around the finish portion 164. The handling valley 240 comprises a portion of the finish portion 164 that has a wall thickness and a diameter that are substantially similar to the wall thickness and diameter of the neck portion 192, below the tamper evidence ledge 176. As such, the handling valley 240 and the neck portion 192 advantageously enable gripping fingers to engage with and support the container 100 during air-conveying the container 100 along a manufacturing assembly. For example, a first pair of gripping fingers can extend into the handling valley 240 to support the container 100 at a first station of a manufacturing line. Then, upon being conveyed to a second station, a second pair of gripping fingers can extend around the neck portion 192, below the tamper evidence ledge 176, while the first pair of gripping fingers are removed from the handling valley 240. Similarly, upon arriving at a third station, a third pair of gripping fingers can engage with the handling valley 240 while the second pair of gripping fingers are removed from the neck portion 192. Thus, the container 100 can be transported along the manufacturing line by alternatingly engaging gripping fingers with the handling valley 240 and the neck portion 192.

As will be appreciated, the handling valley 240 provides a separation between the tamper evidence ledge 176 and the threads 180 suitable for receiving the pair of gripping fingers, as described above. In general, the separation must be large enough to allow the gripping fingers to easily pass between the tamper evidence ledge 176 and the threads 180. As such, any of various separations, greater than the width of the gripping fingers, may be disposed between the tamper evidence ledge 176 and the threads 180, without limitation and without deviating beyond the scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A nozzle for forming a container preform into a plastic container, the nozzle comprising:
   a first cylindrical portion having a first diameter and including a first seal;
   a second cylindrical portion having a second diameter less than the first diameter and including a second seal; and
   a transition portion between the first and second cylindrical portions.

2. The nozzle of claim 1, wherein the second cylindrical portion further includes a tip comprising a narrowing of the second diameter forward of the second seal.

3. The nozzle of claim 2, wherein the tip is a non-linearly tapering tip.

4. The nozzle of claim 1, further comprising an opening whereby stretching and/or blow-molding instruments may be inserted into the container preform.

5. The nozzle of claim 1, wherein the first seal and the second seal comprise O-rings.

6. The nozzle of claim 1, wherein only the second seal comprises an O-ring.

7. The nozzle of claim 1, wherein the first seal is in the form of a circular edge.

8. The nozzle of claim 7, wherein the circular edge is a blunt circular edge.

9. The nozzle of claim 7, wherein the circular edge is a sharp circular edge.

10. The nozzle of claim 1, wherein the transition portion presents a linear transition from the first diameter to the second diameter.

11. A nozzle for a blow-molding process, the nozzle comprising:
    a nozzle body;
    a first sealing portion; and
    a second sealing portion,
    wherein the nozzle is configured to engage a stepped interior of a container preform such that no portion of the nozzle body contacts the stepped interior.

12. The nozzle of claim 11, wherein the nozzle is configured such that upon engagement of the second sealing portion with a stepped interior of a container preform having a longitudinal axis, the second sealing portion is positioned along the longitudinal axis at a different location than the first sealing portion.

13. The nozzle of claim 11, wherein the first and second sealing portions are cylindrical, and wherein the second sealing portion has a larger outer diameter than the first sealing portion.

14. The nozzle of claim 11, wherein the first sealing portion includes a first seal and the second sealing portion includes a second seal, and wherein the first seal and the second seal comprise O-rings.

15. The nozzle of claim 11, wherein the first sealing portion includes a first seal and the second sealing portion includes a second seal, and wherein only the second seal comprises an O-ring.

16. The nozzle of claim 11, wherein the first sealing portion includes a first seal and the second sealing portion includes a second seal, and wherein the first seal is in the form of a circular edge.

17. The nozzle of claim 16, wherein the circular edge is a blunt circular edge.

18. The nozzle of claim 16, wherein the circular edge is a sharp circular edge.

19. The nozzle of claim 11, further including a tapering portion between the first sealing portion and the second sealing portion.

* * * * *